(12) United States Patent
Sholklapper et al.

(10) Patent No.: US 9,419,289 B2
(45) Date of Patent: Aug. 16, 2016

(54) ALKALINE BATTERY OPERATIONAL METHODOLOGY

(71) Applicant: Research Foundation of the City University of New York, New York, NY (US)

(72) Inventors: Tal Sholklapper, West Hills, CA (US); Joshua Gallaway, Astoria, NY (US); Daniel Steingart, Princeton, NJ (US); Nilesh Ingale, New York, NY (US); Michael Nyce, Southbury, CT (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 14/380,008

(22) PCT Filed: Feb. 21, 2013

(86) PCT No.: PCT/US2013/027053
§ 371 (c)(1),
(2) Date: Aug. 20, 2014

(87) PCT Pub. No.: WO2013/126520
PCT Pub. Date: Aug. 29, 2013

(65) Prior Publication Data
US 2015/0030891 A1    Jan. 29, 2015

Related U.S. Application Data

(60) Provisional application No. 61/601,067, filed on Feb. 21, 2012.

(51) Int. Cl.
*H01M 10/24*    (2006.01)
*H01M 6/50*    (2006.01)
(Continued)

(52) U.S. Cl.
CPC .............. *H01M 6/5088* (2013.01); *H01M 6/06* (2013.01); *H01M 10/24* (2013.01);
(Continued)

(58) Field of Classification Search
CPC ................................ H01M 6/00; H01M 10/24
See application file for complete search history.

(56) References Cited

U.S. PATENT DOCUMENTS

| | | | |
|---|---|---|---|
| 4,957,827 | A | 9/1990 | Kordesch et al. |
| 4,977,364 | A | 12/1990 | Kordesch et al. |

(Continued)

FOREIGN PATENT DOCUMENTS

| | | |
|---|---|---|
| EP | 2817847 A1 | 12/2014 |
| WO | 2013126520 A1 | 8/2013 |

OTHER PUBLICATIONS

Foreign communication from a related counterpart application—Search Report, European Application No. 13752257.9, Oct. 14, 2015, 6 pages.

(Continued)

*Primary Examiner* — Stewart Fraser
*Assistant Examiner* — Olatunji Godo
(74) *Attorney, Agent, or Firm* — Andrew M. Metrailer; Conley Rose, P.C.

(57) ABSTRACT

Methods of using specific operational charge and discharge parameters to extend the life of alkaline batteries are disclosed. The methods can be used with any commercial primary or secondary alkaline battery, as well as with newer alkaline battery designs, including batteries with flowing electrolyte. The methods include cycling batteries within a narrow operating voltage window, with minimum and maximum cut-off voltages that are set based on battery characteristics and environmental conditions. The narrow voltage window decreases available capacity but allows the batteries to be cycled for hundreds or thousands of times.

19 Claims, 9 Drawing Sheets

(51) Int. Cl.
*H01M 10/48* (2006.01)
*H01M 10/44* (2006.01)
*H01M 6/06* (2006.01)
*H01M 10/42* (2006.01)

(52) U.S. Cl.
CPC ........... *H01M 10/425* (2013.01); *H01M 10/44* (2013.01); *H01M 10/48* (2013.01); *H01M 2010/4271* (2013.01); *Y02E 60/124* (2013.01)

(56) References Cited

U.S. PATENT DOCUMENTS

| | | |
|---|---|---|
| 5,204,195 A | 4/1993 | Tomantschger et al. |
| 5,281,497 A | 1/1994 | Kordesch et al. |
| 5,336,571 A | 8/1994 | Tomantschger et al. |
| 5,340,666 A | 8/1994 | Tomantschger et al. |
| 5,346,783 A | 9/1994 | Tomantschger et al. |
| 5,424,145 A | 6/1995 | Tomantschger et al. |
| 5,969,508 A * | 10/1999 | Patino ................. H02J 7/008 320/144 |
| 7,333,902 B2 | 2/2008 | Melichar |
| 7,718,305 B2 | 5/2010 | Daniel-Ivad |
| 8,153,300 B2 | 4/2012 | Daniel-Ivad |
| 2005/0264263 A1* | 12/2005 | Tsenter ................. H02J 7/0072 320/128 |
| 2007/0090843 A1* | 4/2007 | De Doncker ....... G01R 31/3662 324/426 |
| 2009/0256528 A1 | 10/2009 | Greening et al. |
| 2009/0273320 A1 | 11/2009 | Ungar et al. |
| 2010/0013430 A1* | 1/2010 | Manor ................. H02J 7/0016 320/106 |
| 2010/0079111 A1 | 4/2010 | Masuda |
| 2011/0018500 A1 | 1/2011 | Takahashi |
| 2011/0224928 A1 | 9/2011 | Lin et al. |

OTHER PUBLICATIONS

Foreign communication from the priority application—International Search Report and Written Opinion, PCT/US2013/027053, Jun. 21, 2013, 6 pages.

Foreign communication from the priority application—International Preliminary Report on Patentability, PCT/US2013/027053, Aug. 26, 2014, 4 pages.

Certified provisional patent application entitled "Alkaline battery operational methodology," by Tal Sholklapper, et al., filed Feb. 21, 2012 as U.S. Appl. No. 61/601,067.

* cited by examiner

ALKALINE BATTERY OPERATIONAL METHODOLOGY

CROSS-REFERENCE TO RELATED APPLICATIONS

This application is a filing under 35 U.S.C. 371 of International Application No. PCT/US2013/027053 filed Feb. 21, 2013 which claimed priority to U.S. Provisional Patent Application No. 61/601,067, filed Feb. 21, 2012, which applications are herein incorporated by reference in their entirety.

STATEMENT OF GOVERNMENT SUPPORT

The invention described and claimed herein was made in part utilizing funds supplied by the U.S. Department of Energy under Contract No. DE-AR0000150. The U.S. Government has certain rights in this invention.

FIELD OF THE INVENTION

This invention relates generally to methods of recharging batteries, and, more specifically, to methods of determining optimum charge-discharge conditions for both secondary and primary alkaline batteries.

BACKGROUND OF THE INVENTION

Most commercial alkaline batteries are primary use, meaning that after a single discharge they are disposed of and replaced. Primary alkaline batteries are produced in high-volume at low-cost by numerous commercial manufacturers. Non-rechargeable, or primary batteries, such as alkaline and carbon-zinc types, make up 80% of dry-cell batteries sold each year. While primary batteries may cost less initially, the need to replace them more frequently than rechargables (which can be used tens to hundreds of times) ends up costing more. Alkaline batteries contain manganese dioxide, graphite, steel, and zinc. Because the cost of recycling non-rechargeable batteries exceeds the value of the materials that can be recovered, fees must be charged to make recycling them economically feasible. Unfortunately, many primary batteries still end up in landfills in spite of community and government efforts.

Each year, over 3 billion primary household batteries are purchased in the United States. Many of these contain heavy metals, such as cadmium, lead, lithium, mercury, nickel, silver, and zinc. If improperly disposed of, buried in landfills, or incinerated, these batteries can harm the environment by leaching into surface water or groundwater, or escaping into the air and soil.

Rechargeable alkaline batteries have recently come to market based on technology developed by Battery Technologies Inc. (See, for example, U.S. Pat. No. 4,957,827, U.S. Pat. No. 5,204,195, U.S. Pat. No. 5,281,497, U.S. Pat. No. 5,336,571, U.S. Pat. No. 5,340,666, U.S. Pat. No. 5,346,783, and U.S. Pat. No. 5,424,145). The technology was commercialized by Pure Energy, Grandcell, EnviroCell, and Rayovac among others. Nonetheless, battery cycle life in rechargeable alkaline batteries is limited due, in part, to the high depth of discharge that is used in commercial applications, which causes irreversible change to the electrochemical components of the battery. Furthermore, manufacturers make proprietary chargers for use with their rechargeable alkaline batteries, which are meant to improve cycleability (See, for example, U.S. Pat. No. 4,977,364, U.S. Pat. No. 8,153,300, and U.S. Pat. No. 7,718,305), and are offered only in small form factors. In general, consumers can expect their rechargeable alkaline batteries to last for tens of cycles to a couple hundred cycles. These limitations have prevented rechargeable alkaline batteries from achieving mainstream adoption; the market for household batteries is still dominated by primary batteries.

Currently, manufacturers recommend against recharging primary batteries because of the danger of acid leaks, fires, and explosions. But, if a way could be found to recharge primary batteries safely and inexpensively, they could be used again and again, thus reducing the amount of batteries in need of recycling.

There is a long-felt need to establish optimum operational parameters for alkaline batteries, both secondary and primary, which achieve maximum cycle life. It would be especially useful to be able to control battery operating discharge conditions, in addition to charge conditions, in order to prevent the irreversible changes that are caused by over-discharging.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
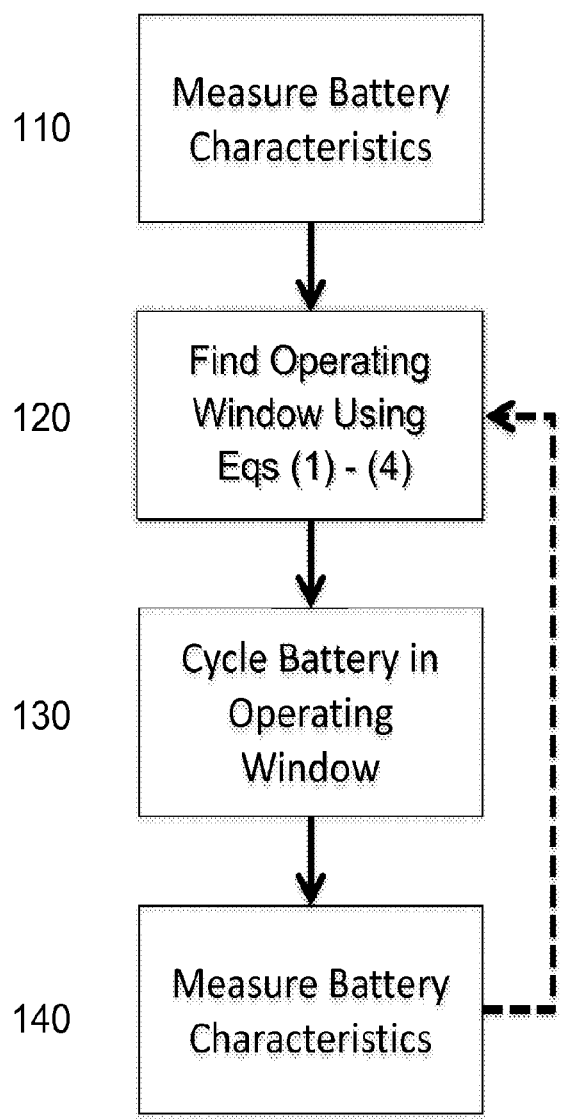
FIG. 1 is a block diagram describing how battery operating conditions are defined.

A novel, new method of operating an alkaline battery is disclosed. The method involves measuring ohmic impedance, R and non-ohmic impedance, $\beta$ of the battery, and determining an initial voltage operating window that has a voltage maximum, $V_{max}$, a voltage minimum, Vmin, using the following equations:

$$V\text{max operation} = V\text{max} + I^*R + \beta$$

$$V\text{min operation} = V\text{min} - I^*R - \beta;$$

where R is ohmic impedance and $_R$ is non-ohmic impedance and $V_{max}$ and $V_{min}$ are given by:

$$V\text{max} = V\text{max at rate} - I^*R - \beta$$

$$V\text{min} = V\text{min at rate} + I^*R + \beta; \text{ and}$$

operating the battery within the initial voltage operating window.

Examples of alkaline batteries for which the methods of the invention can be used include, but are not limited to, commercial primary batteries, commercial secondary batteries, and custom-designed primary or secondary batteries.

In one arrangement, the battery can be operated for a series of cycles with no adjustment to the initial voltage operating window. In another arrangement, a battery deterioration model can be used to modify the voltage operating window periodically as the battery cycles.

In another arrangement, measuring ohmic impedance, R and non-ohmic impedance, β of the battery, and determining a modified voltage operating window are done at fixed intervals, and the battery is operated within the modified voltage operating window after each modification.

DETAILED DESCRIPTION

The aforementioned needs are satisfied by the embodiments of the present invention as described herein.

DEFINITIONS

Battery state of charge (SOC) is given by:

$$SOC = \frac{Q}{Q\text{max}}$$

where Q is battery charge and $Q_{max}$ is the maximum charge that could be retained at the time the SOC is determined. In general, $Q_{max}$ decreases throughout the life of the battery. By definition, when SOC is equal to one, the battery has maximum charge retention. By definition, at complete discharge Q is zero and so SOC is zero also. This discussion assumes that the battery anode and cathode SOC are related by an unchanging or predictable relationship. Initially they are equal. But, over long-time operation, anode and cathode SOC can become de-synchronized; they do not age at the same rate for many reasons, such as an imbalance in self-discharge between anode and cathode. Therefore, it may be useful to define independent anode and cathode states of charge, SOCA and SOCC respectively.

Battery state of health (SOH) is given by:

$$SOH = \frac{Q\text{max}}{Q\text{max, init}}$$

where $Q_{max,init}$ is the maximum the battery can retain at the beginning of its life. $Q_{max,init}$ is a constant. As described above, $Q_{max}$ is a function of time, decreasing over the life of the battery. By definition, when SOH is equal to one, the battery has the full charge it was designed to retain. By definition, when SOH is zero, the battery has no charge, that is, the maximum charge that can be retained is zero. As with SOC, anode and cathode SOH may not be the same over the battery lifetime due to differences in adverse chemical reactions, poisoning, or mechanical degradation at the anode and at the cathode. Therefore, it is useful to define independent anode and cathode states of health, SOHA and SOHC, respectively.

The embodiments of the invention, as disclosed herein, provide operational (charge and discharge) parameters that maximize the SOH in order to extend the lives of secondary alkaline batteries and to allow primary alkaline batteries to cycle long beyond their normal lifetimes by rendering them rechargeable for hundreds of cycles or more. The embodiments of the invention can be used with any primary or secondary alkaline batteries, both those that are well-known and commercially available and those that are designed for special purposes, including batteries with flowing electrolyte.

Generally, batteries are designed to operate in the widest possible voltage window to draw out maximum energy. Unfortunately, this aggressive approach is detrimental to battery lifetimes. Wide voltage windows, fast charge and discharge, overcharge and deep discharge all accelerate battery deterioration, increasing internal resistance and reducing battery SOH.

Surprisingly, it has been found that when batteries are cycled in a narrow operating voltage window, their lives can be lengthened greatly, and primary batteries can be recharged with no danger. In one embodiment of the invention, minimum and maximum cut-off voltages are determined based on battery characteristics and environmental conditions. Although the narrow voltage window allows the battery to operate stably over a long lifetime, there is a tradeoff. The narrow voltage window also decreases available capacity. Yet this capacity can be accessed many more times than has been possible before. By employing the methods disclosed herein, each battery can provide much more energy over its lifetime by continuing to operate, and operate well, over very many cycles. Nevertheless, the desire to maximize voltage and current is well-appreciated, and the methods described herein have been developed to optimize lifetime with the greatest energy possible.

It is important to note that whether an increased cycle life is a worthwhile exchange for reduced energy and energy density. In mobile applications where high energy density is very important, it may not be worthwhile. But for stationary applications, energy density is a lower priority. Generally, the battery is not going to be moved around, so extra weight (to achieve desired energy) is not a drawback. Often in stationary applications, cost and lifetime are the primary drivers. Since manganese-dioxide-based alkaline battery materials are inexpensive, it can make good economic sense to increase the size of a battery system so that the methods disclosed herein can be used to achieve maximize lifetime while still getting desired capacity (at lower energy density).

Examples of characteristics that are considered in determining operating parameters both initially and during cycling include, but are not limited to, impedance, open circuit potential, in cycle resistance, voltage drop at discharge initiation, voltage rise at charge initiation, and environmental conditions, including but not limited to: temperature, humidity, pressure and altitude.

The embodiments of the present invention can be used for any alkaline battery of any size. Examples of common commercial battery sizes for both single-use (primary) and rechargeable (secondary) batteries are given in Table 1. It is to be understood that the battery formats listed in Table 1 are meant to be examples only and are not meant to be limiting in any way. One of ordinary skill in the art would also be able to apply the method of the present invention to non-standard battery formats.

TABLE 1

Common Alkaline Battery Formats

| Size | Single-Use* | Rechargeable** |
|------|-------------|----------------|
| AA   | LR6         | DC 1500        |
| AAA  | LR03        | DC2400         |

TABLE 1-continued

Common Alkaline Battery Formats

| Size | Single-Use* | Rechargeable** |
|---|---|---|
| C | LR14 | |
| D | LR20 | |
| 9 Volt | 6LR61 | 6KR61, 6HR61 |
| 6 Volt Lantern | 4LR25X(Y) | |
| Button Cells | LR Series | |

*from the International Electrotechnical Commission
**Duracell ® nomenclature

In one embodiment of the invention, initial operating parameters are set at the start of the battery's life, based on initial characteristics and environmental conditions, and they are not changed over the lifetime of the battery.

In another embodiment of the invention, operating parameters are set initially but are adjusted dynamically in response to changes in battery characteristics, SOC, SOH, and when possible, SOCA, SOCC, SOHA, and SOHC, as well as changes in environmental conditions periodically during operation. This is especially desirable because, by making adjustments during battery operation, one can be sure that the adjusted operating parameters are correct for the battery as it ages. In some embodiments of the invention, SOC and SOH are assessed during operation by any of several transient techniques. Examples include electrochemical impedance spectroscopy (EIS) and current interruption (CI), which are well known techniques to one of ordinary skill in the art. In the case of EIS, a sinusoidal perturbation is imposed on the battery voltage, and the corresponding current sinusoid is measured. This is done at many frequencies, resulting in a spectrum. In current interruption, the current load is disengaged, and the potential transient is measured instantly and on time scales of microseconds, milliseconds, and seconds. SOC and SOH may also be assessed by any other technique that can determine this information can also be used.

In another embodiment of the invention, the initial operating parameters are determined at the start of the battery's life, but they are adjusted according to a degradation model built into the controlling software that adjusts the voltage window as the battery ages, thus avoiding active monitoring, and its associated cost, to determine changes in operation parameters. There are microcontroller(s) in electronic communication with one or more battery cells and are used to monitor the SOH and implement changes in operating parameters as the cells are cycled.

The embodiments of the invention, as described herein, can be used with various charging and discharging schemes, such as with constant, variable, and/or pulsed current, and/or with constant voltage. The operating conditions for any particular battery may include any number of the these charge and discharge schemes and may also include a number of intermediate steps as desired depending on the how the battery is being used, as well as rest periods in which no current is passed.

In one embodiment of the invention, an initial operating voltage window is determined by finding intrinsic safe maximum and minimum potential for a battery, Vmax and Vmin. These potentials can be determined by cycling a number of batteries, under a fixed constant current rate I while testing a variety of maximum and minimum potentials. A successful test maintains a good SOH for a maximum number of cycles, a long lifetime. The SOH can be determined by observing the battery efficiency during cycling. A stable efficiency for many hundreds or thousands of cycles establishes a safe potential window at that rate, Vmax at rate and Vmin at rate. If the potential drop due to I*R losses at rate, I are subtracted from Vmax at rate and Vmin at rate from which the intrinsic safe maximum and minimum potentials for the battery can be found using:

$$V\max = V\max \text{ at rate} - I^*R - \beta \quad (1)$$

$$V\min = V\min \text{ at rate} + I^*R + \beta \quad (2)$$

where I, is the rate, and R and β are battery-specific impedance characteristics. Specifically, R is the ohmic impedance and β is the non-ohmic, or kinetic, impedance. The impedance is a function of the intrinsic characteristics of the battery as well as external environmental conditions. In other words, the impedance characteristics, R and β, vary depending on environmental conditions such as temperature, humidity, and pressure. Therefore, it is important to take into account environmental conditions when determining the operation potential limits, Vmin operation and Vmax operation.

Finally, according to an embodiment of the invention, the operation potential window is determined using the following formulas:

$$V\max \text{ operation} = V\max + I^*R + \beta \quad (3)$$

$$V\min \text{ operation} = V\min - I^*R - \beta \quad (4)$$

where again, I is the rate at which the battery will be operated, and R and β are battery-specific (and environment-specific) impedance characteristics. The impedance characteristics can be measured through EIS or Current Interrupt (CI) techniques. Once the impedance characteristics of a battery are measured, the operating window can be determined using Equations (3) and (4). When the battery cycles within such an operating window, it can achieve long cycle life, in the 100's to 1000's of cycles.

FIG. 1 is a block diagram that shows steps in a method of operating a battery with dynamic voltage window determination, according to an embodiment of the invention. In step 110, the battery characteristics are measured. As discussed above, such parameters may include impedance, open circuit potential, in cycle resistance, voltage drop at discharge initiation, voltage rise at charge initiation, and environmental parameters, including but not limited to temperature, humidity, pressure and altitude. In step 120, a voltage operating window is defined using Equations (3) and (4) above. In step 130, the battery is cycled within the voltage window. In step 140, battery characteristics are measured again. After step 140, the next step is to go back to step 120 to define a voltage window again based on the battery characteristics measured in step 140. If there has been no change in the battery characteristics, there is no change in the voltage window. But if the SOH of the battery has changed, the voltage window will be adjusted to optimize for the new situation. FIG. 1 shows that the battery characteristics are measured and a voltage operating window is found after each cycle. In other arrangements, battery characteristics are measured and a voltage operating window is found at other intervals. For example, this can be done at any point throughout the cycle as desired by the user. It can be done during rest period(s) in the cycle. It can be done daily or weekly. The frequency of voltage window modification can be chose by the user.

EXAMPLES

The following examples provide details relating to using the methods described in the embodiments of the present invention. It should be understood the following is representative only, and that the invention is not limited by the detail set forth in these examples.

Example 1

Figure 2:
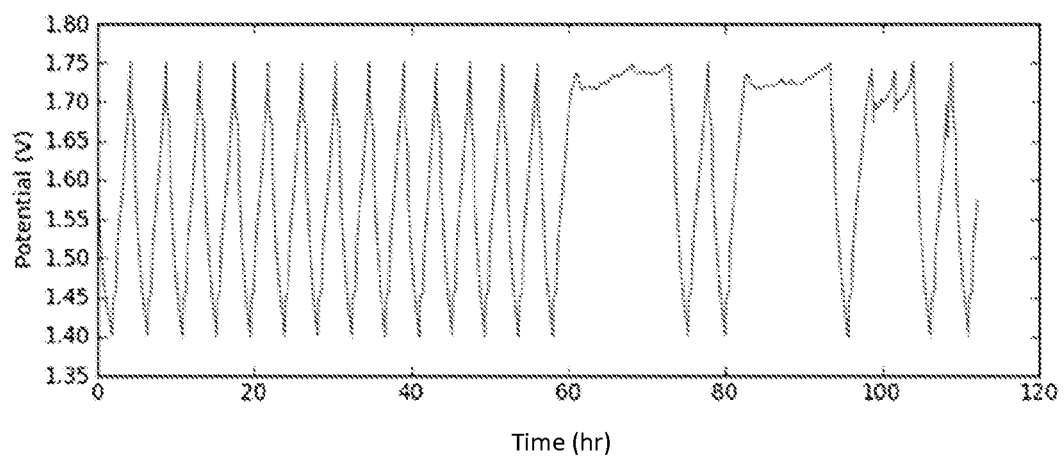
FIG. 2 is a graph that shows the potential of a battery as it is cycled over time (hours) as discussed in the Example.

A Duracell® LR6 (AA) alkaline battery was cycled between 1.75 volts and 1.40 volts. The battery active components are manganese dioxide (cathode) and zinc (anode), which are compacted into a metal can and separated by separator filled with electrolyte. The battery was cycled between 1.4 and 1.75 volts as an example of a test to determine the intrinsic safe maximum and minimum potentials derived by equations (1) and (2). The cycling curve is shown in FIG. 2. After only 15 cycles, at roughly 60 hours, the battery charged only to about 1.7 volts and could no longer accept charge up to 1.75V, indicating deterioration and concomitant lost efficiency. The result suggests that the 1.75 volt peak potential was too high to be used as the maximum potential for the battery. Thus, the cell failed early due to operational parameters that were not set to optimize lifetime.

Example 2

Through a combination of cycling observations, such as described in Example 1, the procedure described to determine equations (1) and (2) was used (where potentials were varied at a fixed rate) to determining an optimum voltage operating window, at 100 mA charge and discharge rate for Duracell® LR6(AA) batteries, of:

$$V\text{max},100 \text{ mA}=1.55\text{-}1.525V \quad (5)$$

$$V\text{min},100 \text{ mA}=1.25\text{-}1.225V \quad (6)$$

Using this observed window at fixed current, and providing an adjustment based on recorded ohmic losses, an operating voltage window is defined for other currents (I) as:

$$V\text{max}=V_m ax,100 \text{ mA}+0.3807*(I-0.1) \quad (7)$$

$$V\text{min}=V\text{min},100 \text{ mA}-0.3807*(I-0.1) \quad (8)$$

Furthermore, the operating voltage window is derived for alternative battery formats, including novel battery designs, to provide a formula for calculating operating windows in general:

$$V\text{max}=VAA_{max},100 \text{ mA}+I*R+\beta-0.04587 \quad (9)$$

$$V\text{min}=VAA \text{ min},100 \text{ mA}-I*R-\beta+0.04587 \quad (10)$$

where I is current, and R and $\beta$ are battery specific impedance characteristics. Specifically, R is the ohmic impedance and $\beta$ is the non-ohmic, or kinetic, impedance. Once the impedance characteristics of a battery are measured, the operating window is defined by Equations (3) and (4) as described earlier. When the battery is operating in this voltage window, it can achieve long cycle life, in the hundreds to thousands of cycles.

Figure 3:
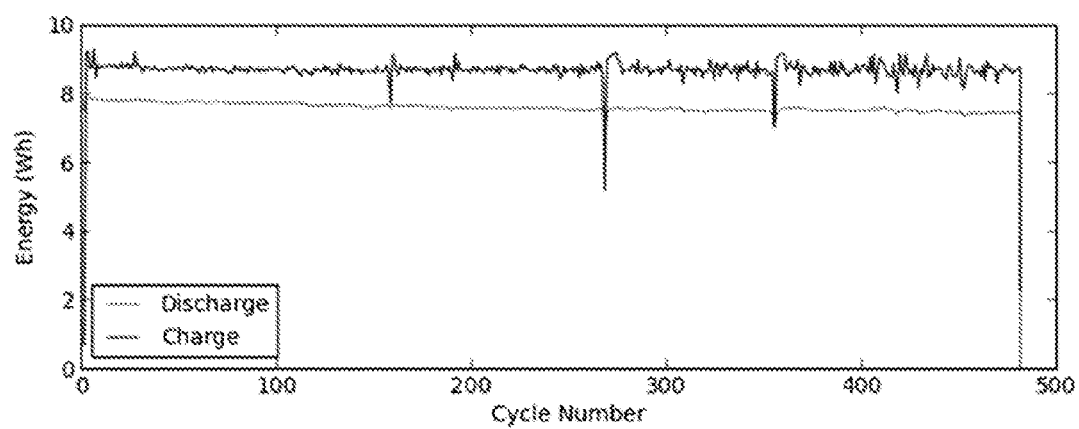
FIG. 3 is a graph that shows Coulombic and energy efficiency as a function of cycle number for the cell discussed in the Example.

As shown in FIG. 3, a Duracell® LR6 (AA) single-use battery is cycled in its safe operating window of 1.55 volts to 1.40 volts. The primary commercial battery continues to cycle for nearly 500 cycles and is still going. And this is a battery that was meant to be used once and thrown away. For batteries cycled in an optimized operation window, capacities of up to 50% of the MnO2 cathode one electron capacity are attained for hundreds of cycles. When 10 to 25% of the one electron capacity is used, the batteries have been shown to achieve several hundred to nearly 2000 cycles.

Example 3

Figure 4A:
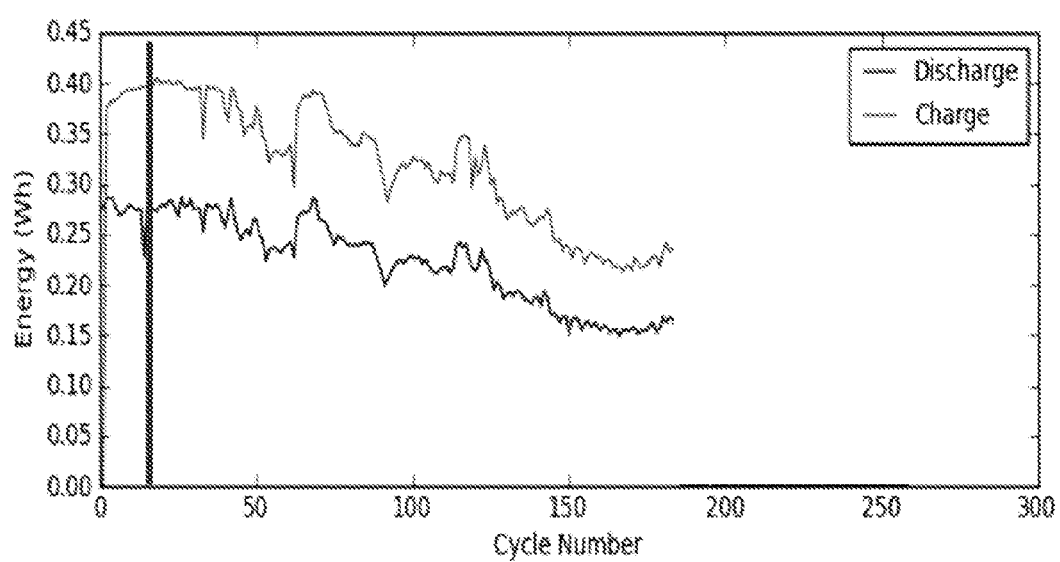
FIG. 4A is a graph that shows energy as a function of cycle number for the cell discussed in the Example.

FIG. 4A shows charge and discharge energy (Wh) of a manganese dioxide-cadmium storage battery with non-dynamic charging parameters. The cycling rate is C/20 based on total manganese-dioxide capacity of the battery capacity, with each cycle discharged to only 10% of the MnO2 cathodes one electron capacity. Battery SOH is starting to deteriorate beginning around cycle 40 and results in failure near cycle 200.

Figure 4B:
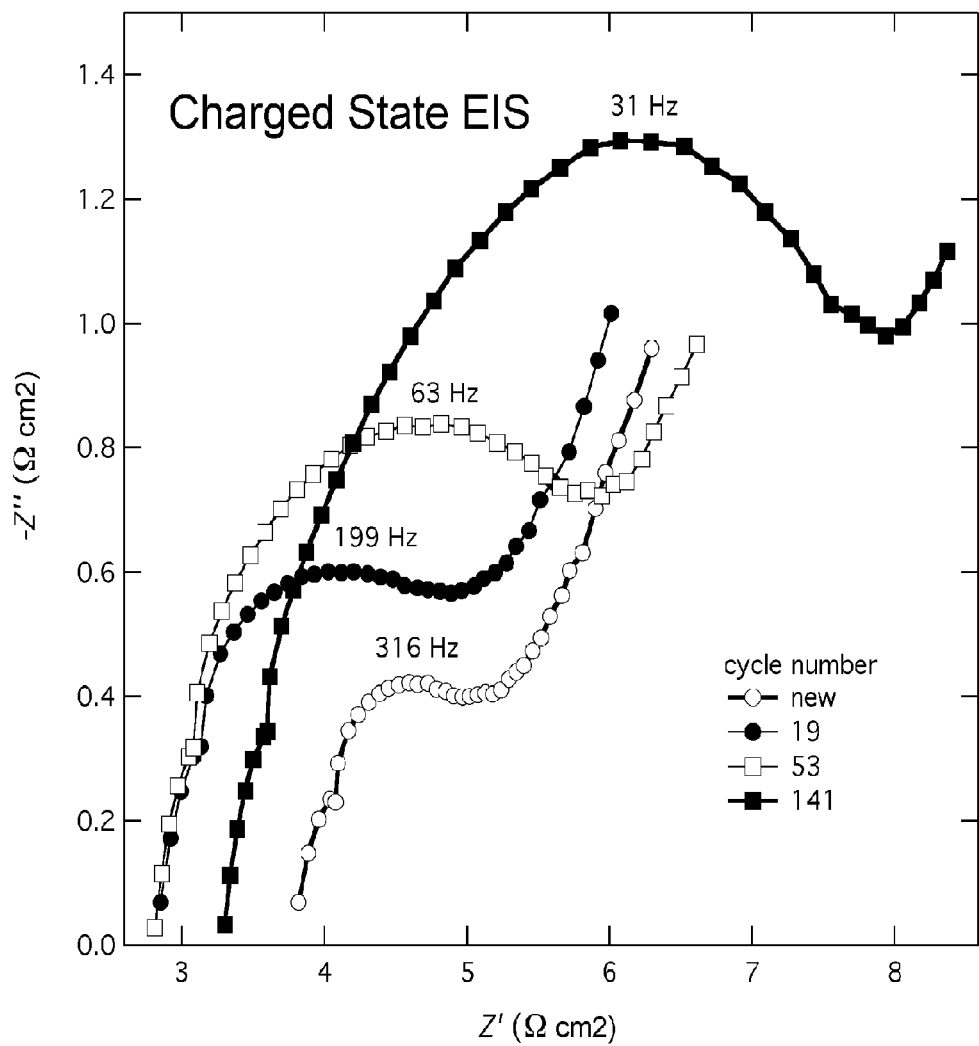
FIG. 4B is a graph that shows EIS as a function of cycle number for the cell discussed in the Example.

FIG. 4B shows periodic EIS data for the cell described in FIG. 4A. The data is plotted as imaginary impedance vs. real impedance. Each curve was measured at a different cycle number. The height of each curve endpoint is inversely proportional to of SOH. In comparing the curve for cycle 19, with the curve for the new (first cycle) battery, it can be seen that the SOH is decreasing, indicating battery deterioration. Thus the deterioration in battery SOH can be detected long before it is apparent from monitoring battery energy over time. The impedance data in FIG. 4B can be fed back into equations (1) and (2) to dynamically modify the voltage operation window of the battery.

Example 4

Figure 5A:
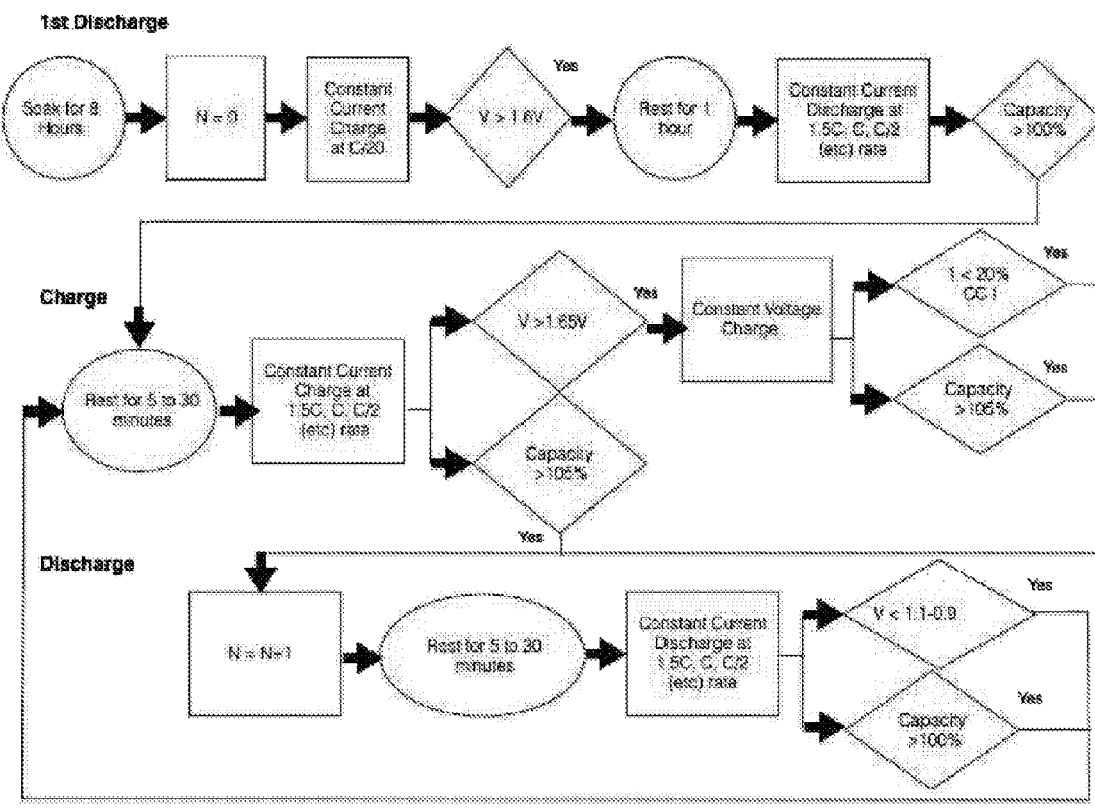
FIG. 5A is a block diagram describing the operating protocol for a pasted Zn—MnO2 Alkaline battery.

FIG. 5A shows the operating parameters that were used to cycle a pasted-electrode Zn/MnO2 battery, according to an embodiment of the invention. Note that batteries constructed in this fashion are traditionally made for single use. There was no active monitoring of the battery SOH. The voltage window was set before cycling began and was not changed later.

The battery has a series of anode and cathodes connected in parallel to build capacity. The cathodes are composed of 65 wt % MnO2 (Tronox, AB Grade), 30 wt % graphite (Timcal, Timrex® KS44), and 5 wt % Teflon® emulsion. The anodes are composed of 85 wt % alloyed Zn (Umicore, 33384198), 10 wt % ZnO (Fisher Chemical), and 5 wt % Teflon® emulsion. Both electrodes are pressed onto expanded Ni collectors. The anode is wrapped in a Pellon® membrane, while the cathode is wrapped in three layers of cellophane (Innovia Films, 350P00). The electrodes are stacked in alternating fashion to build the battery. The alkaline electrolyte is 30 wt % KOH.

The battery has of a total of 46 cathodes and 47 anodes for a total capacity of 205.62 Ah, of which, 10.281 Ah or 20.562 Ah, was accessed when cycling to 10% or 20% of the MnO2 cathode one electron capacity, respectively.

Figure 5B:
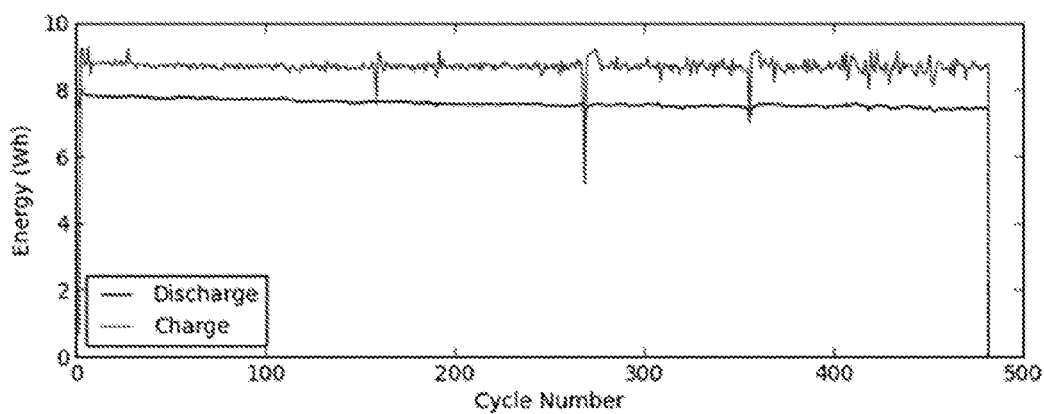
FIG. 5B is a graph that shows charge and discharge energy as a function of cycle number for the cell discussed in the Example.

FIG. 5B shows the charge and discharge energy as the battery is cycled. The battery has cycled stably for nearly 500 cycles, and is still going. Again, these results are for a battery that is typically single use.

Example 5

Figure 6A:
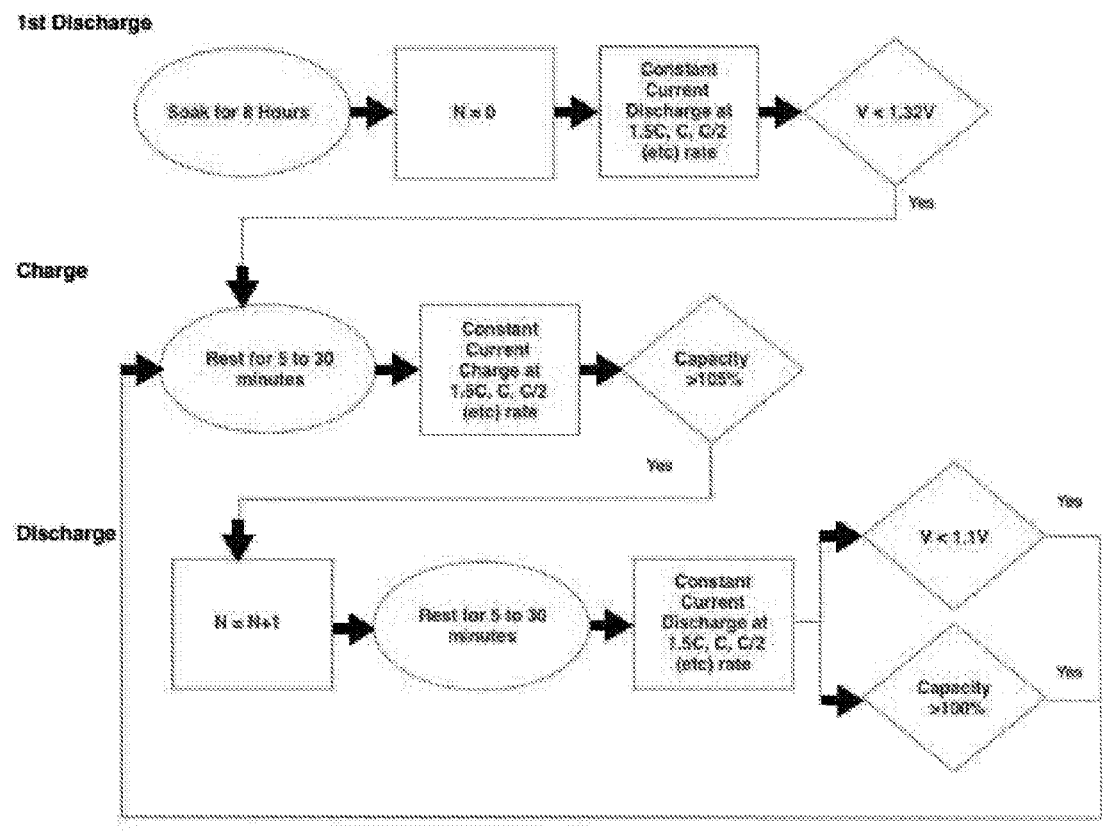
FIG. 6A is a block diagram describing the operating protocol for a Zn—MnO2 Alkaline battery with flowing electrolyte.

FIG. 6A shows the operating parameters that were used to cycle a flowing electrolyte Zn/MnO2 battery, according to an embodiment of the invention. The battery has a series of anodes and cathodes connected in parallel to build capacity. The cathodes are composed of 65 wt % MnO2 (Tronox, AB Grade), 30 wt % graphite (Timcal, Timrex® KS44), and 5 wt % Teflon® emulsion, and is pressed onto expanded Ni current collectors. The battery is cycled with the operation parameters shown in the block diagram in FIG. 6A.

The anode current collector is a flat sheet of Ni-plated Cu onto which Zn is plated and subsequently de-plated from the electrolyte. The alkaline electrolyte is 37 wt % KOH, and contains 60 g/L of ZnO.

The electrodes are stacked in alternating fashion with an acrylic spacer (3 mm) to build the battery. The spacer enables electrolyte to flow over the electrodes so that Zn plating and de-plating can occur. The electrolyte had a flow rate of roughly 0.5 cm/sec.

The battery has a total of 7 cathodes and 8 anodes for a total capacity of 31.05 Ah, of which 3.105 Ah was accessed when cycling to 20% of the MnO2 cathode one electron capacity.

Figure 6B:
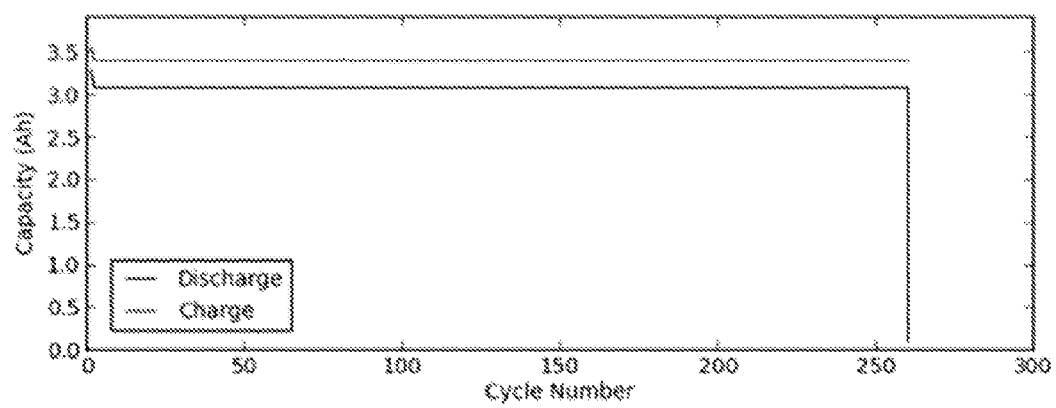
FIG. 6B is a graph that shows charge and discharge capacity as a function of cycle number for the cell discussed in the Example.

FIG. 6B shows the charge and discharge capacity as the battery is cycled. The battery has cycled stably for more than 250 cycles, and is still going.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

What is claimed is:

1. A method of operating an alkaline battery comprising the steps of:
    a) providing an alkaline battery;
    b) measuring ohmic impedance, R, and non-ohmic impedance, $\beta$, of the alkaline battery;
    c) determining an initial operation voltage window that has a voltage maximum, $V_{max\ operation}$, and a voltage minimum, $V_{min\ operation}$, using the following:

$V_{max\ operation} = V_{max} + I*R + \beta$ $V_{min\ operation} = V_{min} - I*R - \beta;$ where R is ohmic impedance, $\beta$ is non-ohmic impedance, I is a current rate at which the alkaline battery is operated, and $V_{max}$ and $V_{min}$ are given by:

$V_{max} = V_{max\ at\ rate} - I*R - \beta$ $V_{min} = V_{min\ at\ rate} + I*R + \beta;$ and wherein $V_{min\ at\ rate}$ and $V_{max\ at\ rate}$ are a minimum potential and a maximum potential, respectively, at the current rate I,
    d) operating the alkaline battery within the initial operation voltage window.

2. The method of claim 1 wherein, in step a, the alkaline battery is selected from the group consisting of commercial primary batteries, commercial secondary batteries, and custom-designed primary or secondary batteries.

3. The method of claim 1 wherein, in step b, the ohmic impedance is measured using EIS or current interrupt.

4. The method of claim 1 wherein, in step b, the non-ohmic impedance is measured using EIS or current interrupt.

5. The method of claim 1 wherein, in step d, the battery is operated for a series of cycles without an adjustment to the initial operation voltage window.

6. The method of claim 1, further comprising an additional step c.1 between steps c and d wherein step c.1 comprises employing a battery deterioration model to modify the initial operation voltage window as the battery cycles, and wherein step d comprises operating the battery within each modified operation voltage window.

7. The method of claim 1, further comprising repetition of steps b, c, and d at intervals as the battery is cycled to determine a modified operation voltage window, and, in step d, the battery is operated within the modified operation voltage window.

8. The method of claim 1, further comprising:
    determining a first state of health of the battery after step c)
    determining a second state of health of the battery after step d);
    determining that the state of health of the battery has changed from the first state of health to the second state of health;
    redetermining the operation voltage window after step d); and
    operating the battery within the modified operation voltage window.

9. The method of claim 1, wherein the alkaline battery comprises a manganese dioxide cathode.

10. The method of claim 9, wherein the alkaline battery comprises an anode comprising zinc or cadmium.

11. The method of claim 9, wherein operating the alkaline battery comprises operating the battery at less than or equal to 50% of the manganese dioxide one electron capacity.

12. The method of claim 9, wherein operating the alkaline battery comprises operating the battery at 10% to 25% of the manganese dioxide one electron capacity.

13. The method of claim 1, wherein operating the alkaline battery comprises accessing only a portion of the capacity of the alkaline battery between a discharge and recharge cycle.

14. A method of operating an alkaline battery, the method comprising:
    a) measuring ohmic impedance, R, and non-ohmic impedance, $\beta$, of an alkaline battery, wherein the alkaline battery comprises a cathode and an anode, wherein the cathode comprises manganese dioxide and wherein the anode comprises at least one of zinc or cadmium;
    b) determining an initial operation voltage window that has a voltage maximum, $V_{max\ operation}$, and a voltage minimum, $V_{min\ operation}$, using the following:

$V_{max\ operation} = V_{max} + I*R + \beta$ $V_{min\ operation} = V_{min} - I*R - \beta;$ where R is ohmic impedance, $\beta$ is non-ohmic impedance, I is a current rate at which the alkaline battery is operated, and $V_{max}$ and $V_{min}$ are given by:

$V_{max} = V_{max\ at\ rate} + I*R - \beta$ $V_{min} = V_{min\ at\ rate} - I*R + \beta;$ and wherein $V_{min\ at\ rate}$ and $V_{max\ at\ rate}$ are a minimum potential and a maximum potential, respectively, at the current rate I,
    c) operating the alkaline battery within the initial operation voltage window.

15. The method of claim 14, wherein the cathode further comprises graphite and polytetrafluoroethylene.

16. The method of claim 14, wherein the alkaline battery further comprises an electrolyte, wherein the electrolyte comprises potassium hydroxide.

17. The method of claim 14, wherein at least one of the cathode or the anode comprises a nickel current collector.

18. The method of claim 14, wherein operating the alkaline battery comprises accessing only a portion of the capacity of the alkaline battery between a discharge and recharge cycle.

19. A method of operating an alkaline battery, the method comprising: measuring ohmic impedance, R, and non-ohmic impedance, $\beta$, of an alkaline battery;
    determining an initial operation voltage window that has a voltage maximum, $V_{max\ operation}$, and a voltage minimum, $V_{min\ operation}$, using the ohmic impedance, the non-ohmic impedance, a current rate at which the alkaline battery is operated, and a minimum potential and a maximum potential at the current rate at which the alkaline battery is operated; and operating the alkaline battery within the initial operation voltage window, wherein operating the alkaline battery within the initial operation voltage window comprises charging and discharging the alkaline battery a plurality of times while remaining within the initial operation voltage window.

* * * * *